H. A. FLEMING.
VEHICLE LIGHT CONTROLLER.
APPLICATION FILED MAR. 22, 1917.
1,238,121. Patented Aug. 28, 1917.
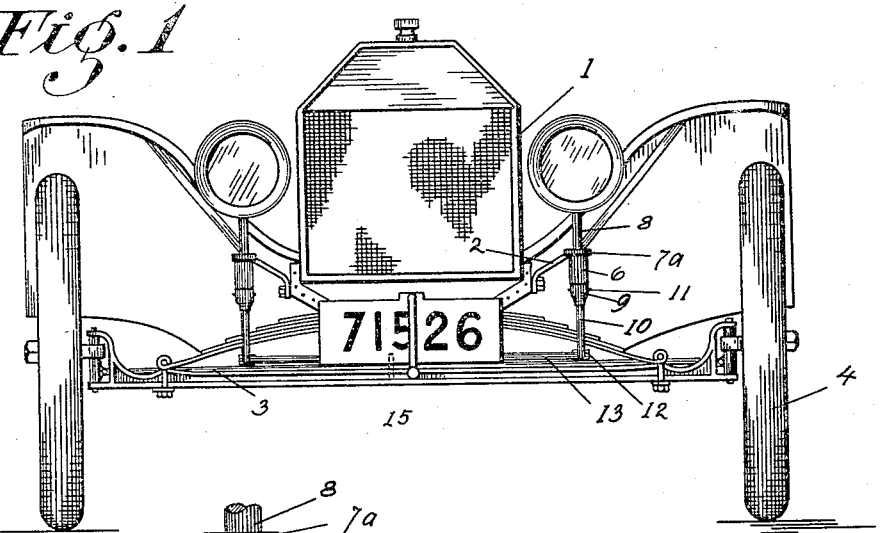
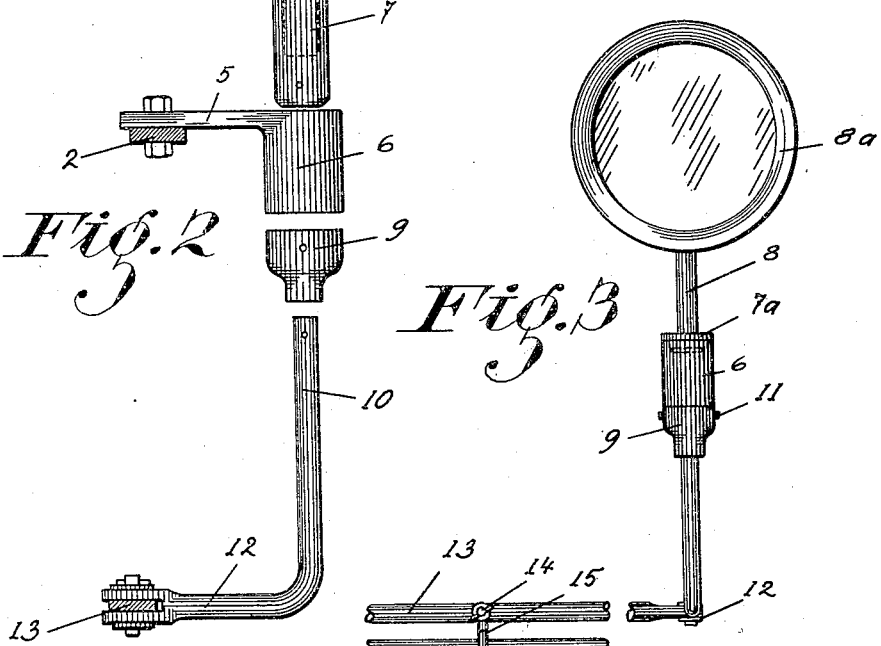
WITNESS:
Bernard Privat
INVENTOR.
Herman A. Fleming.
BY
ATTORNEY.

UNITED STATES PATENT OFFICE.

HERMAN A. FLEMING, OF RICHMOND, CALIFORNIA, ASSIGNOR OF ONE-HALF TO WALTER GIANELLA, OF RICHMOND, CALIFORNIA.

VEHICLE-LIGHT CONTROLLER.

1,238,121.  Specification of Letters Patent.  Patented Aug. 28, 1917.

Application filed March 22, 1917. Serial No. 156,582.

*To all whom it may concern:*

Be it known that I, HERMAN A. FLEMING, a citizen of Canada, residing at Richmond, in the county of San Joaquin, State of California, have invented certain new and useful Improvements in Vehicle-Light Controllers; and I do declare the following to be a full, clear, and exact description of the same, reference being had to the accompanying drawings, and to the characters of reference marked thereon, which form a part of this application.

This invention relates to a means for controlling the position of head lights mounted on motor vehicles whereby the same will be dirigible and arranged to turn in the same relative direction in which the vehicle may be steered and at all times follow this direction as the front steering wheels of the vehicle are turned in one direction or the other. Traveling at night especially in mountainous country is very dangerous with the ordinary form of head lights due to the fact that at any precipice or hill the lights throw off into space instead of upon the road. The road often turns and twists and drops in at different angles just at a crest of a hill which renders the driving of a vehicle at night very dangerous where the lights do not follow ahead. The same is likewise true in connection with any night driving in any locality especially in driving around winding roads and the like where the lights are of very little use when rigidly attached to the vehicle. I aim to overcome these conditions by providing the head lights so they will be dirigibly connected with the cross steering rod of the vehicle. I also aim to have the said lights far enough ahead of the supporting post so that they will have a sufficient amount of space to turn freely. I aim to construct the connecting means for the lamp so that the same may be rigidly and quickly mounted on the vehicle or as quickly removed at will.

Figure 1 is a front elevation of my improved dirigible lamps showing how they are mounted on the vehicle.

Fig. 2 is a side elevation of the lamp supporting structure with the parts disassociated.

Fig. 3 is a front elevation of the same showing the parts connected together and the lamp in position therein.

Referring now more particularly to the characters of reference on the drawings the numeral 1 designates the vehicle having the usual lamp bracket 2 below which is disposed the cross steering rod 3 for steering the wheels 4 in either direction. My improved invention comprises for each lamp an extending arm 5 suitably secured to the bracket 2 and extending outwardly a sufficient distance therefrom to allow the lamps to have a free turning movement relative to the vehicle. At the outer end of each arm 5 is a centrally orificed sleeve 6. The numeral 7 designates a socketed pin adapted to receive the lamp post 8, in its socket and said pin 7 projects through the sleeve 6 and is provided on its upper end with a flange 7$^a$ adapted to hold the pin 7 vertically in the sleeve 6. The lower end of the pin 7 projects below the lower end of the sleeve 6 and into a socketed head 9 on the upper end of the turning rod 10 where it is removably secured by means of a pin 11. The member 9 fits closely against the under side of the sleeve 6 so that the said pin 7 will have no vertical play within the said sleeve 6 but will merely have a free turning movement therein. At the lower end the rod 10 angles rearedly as at 12. The members 12 for each lamp are connected by a cross bar 13, which cross bar is in turn fixedly connected as at 14 with a pin 15 fixed to the steering rod 3. The removable pin 11 and the feature of having the lower end of the socketed pin fitting into the socketed member 9 permits the parts to be readily and quickly associated together or taken apart for any purpose.

When the vehicle is being driven and the rod moves in either direction by steering the vehicle one way or the other this action moves the rod 13 in the same degree as the rod 3 is moved. This acts against the members 12 and turns the rods 10. The turning of the rods 10 causes the lamps 8$^a$ to be turned in which ever direction the vehicle is turned in so that the light from said lamps is always directly ahead of the vehicle and not at any angle thereto as is now often the case.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention as defined by the appended claim.

Having thus described my invention what I claim as new and useful and desire to secure by Letters Patent is:

A vehicle light controller comprising the combination with a vehicle having a lamp bracket close to the body of the vehicle of an arm fixed to the bracket and extending a distance from the body of the vehicle sufficient to allow a freedom of movement of the lamp, the arm terminating at its outer end in a vertical sleeve, a socketed pin turnable in the sleeve and projecting a distance below the same, a vertical rod having a socketed head, the lower end of the pin being removably secured in the socketed head whereby the parts may be readily and quickly associated or disassociated, a lamp having a supporting post fitted into the socket, the lower end of the vertical rod angling backward to a point beneath the vehicle and operatively connected with the steering rod of the vehicle whereby the lamp will be turned in the same direction in which the vehicle is steered.

In testimony whereof I affix my signature.

HERMAN A. FLEMING.

Copies of this patent may be obtained for five cents each, by addressing the "Commissioner of Patents, Washington, D. C."